(12) United States Patent
Tamura et al.

(10) Patent No.: US 7,644,492 B2
(45) Date of Patent: Jan. 12, 2010

(54) DYNAMOELECTRIC WINDING END PORTION FORMING APPARATUS

(75) Inventors: Syuichi Tamura, Tokyo (JP); Naohiko Harada, Tokyo (JP); Michiya Yasui, Tokyo (JP); Shogo Okamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 404 days.

(21) Appl. No.: 11/595,870

(22) Filed: Nov. 13, 2006

(65) Prior Publication Data

US 2007/0271773 A1 Nov. 29, 2007

(30) Foreign Application Priority Data

May 24, 2006 (JP) ............................. 2006-144290

(51) Int. Cl.
*H02K 15/00* (2006.01)

(52) U.S. Cl. .......................................... 29/732; 29/596

(58) Field of Classification Search .................... 29/596, 29/732, 735, 598
See application file for complete search history.

(56) References Cited

U.S. PATENT DOCUMENTS 6,446,329 B1 * 9/2002 DeHart ........................ 29/735

FOREIGN PATENT DOCUMENTS

| JP | 55-171420 U | 12/1980 |
| JP | 2004-135438 A | 4/2004 |
| JP | 2006-033964 A | 2/2006 |

* cited by examiner

*Primary Examiner*—A. Dexter Tugbang
*Assistant Examiner*—Livius R Cazan
(74) *Attorney, Agent, or Firm*—Sughrue Mion, PLLC

(57) ABSTRACT

A holding jig is made into cylindrical body that has a conductor insertion aperture, and a conductor end portion is inserted into the conductor insertion aperture in a loosely-fitted state and held. The holding jig is moved along an arc that has a radius L that is centered around a projecting root portion of the conductor end portion to a vicinity of a coil end to bend and form the conductor end portion into a desired lead around shape.

3 Claims, 9 Drawing Sheets

FIG. 9A
FIG. 9B
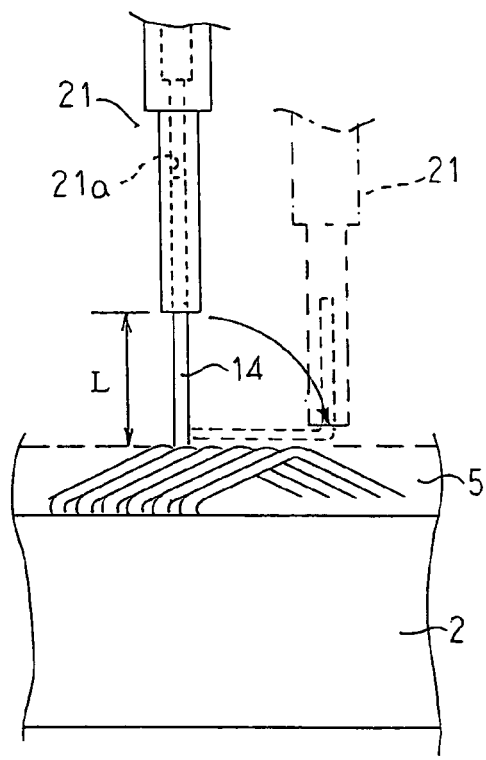
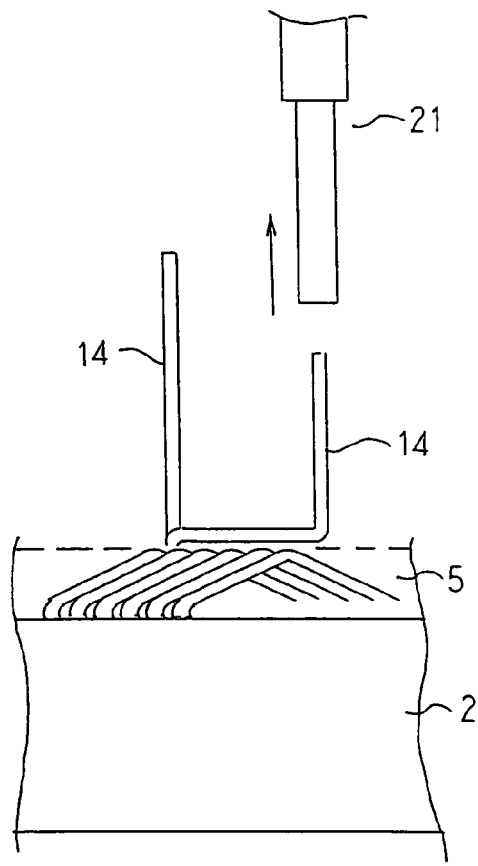

DYNAMOELECTRIC WINDING END PORTION FORMING APPARATUS

BACKGROUND OF THE INVENTION

1. Field of the Invention

The present invention relates to an apparatus and a method for forming a winding for a dynamoelectric machine such as an automotive alternator, etc., and particularly relates to an apparatus and a method for forming a conducting wire end portion such as an output wire of a dynamoelectric stator winding, etc.

2. Description of the Related Art

Conventional stator winding end portion bending apparatuses are used in dynamoelectric machines in which coil segments are stacked and inserted into a plurality of slots of a stator core so as to form a plurality of coil layers, and in each of the coil layers, form open end portions of large numbers of coil segments that constitute the coil layers in question that project out of the slots by bending and twisting appropriately (see Patent Literature 1, for example).

In these conventional apparatuses, a plurality of cylindrical stratified ring belts have projecting portions that form a large number of holding grooves that hold tip end portions of the open end portions of the coil segments circumferentially on first edge portions in an axial length direction, and are disposed coaxially so as to leave a predetermined clearance radially.

Patent Literature 1: Japanese Patent Laid-Open No. 2004-135438 (Gazette)

However, in the conventional devices that are described above, details of an operation that presents many obstacles to achieving mass production, i.e., details of the complicated operation of inserting the tip end portions of the conductor end portions one by one into the corresponding holding grooves of the stratified ring belts, are not described at all. The protruding conductor end portions can sway relatively freely toward the tip ends and circumstances can arise in which these tip end portions dislodge from openings of the holding grooves as the tip end portions are being inserted into the holding grooves. That risk increases significantly if the conductor end portions have a circular cross section, in particular. Thus, since a means for reliably introducing and holding adjacent tip end portions of a plurality of conductor end portions into the holding grooves is required before the stratified ring belts can be used, overall productivity can hardly be said to have improved. This is a major obstacle when attempting to apply bending simultaneously to a plurality of conductor end portions.

In stators of this kind, a plurality of conductor end portions may also project outward from a stator core or tightly-packed coil ends in a state of close contact. The end portions of large numbers of continuous conductor wires project outward from the coil ends in a state of close contact particularly in stators that are configured by installing winding assemblies that are prepared by simultaneously folding large numbers of continuous conductor wires in a stator core in multiple layers. The conductor end portions that project out from the coil ends are often led around and formed so as to conform to arrangements or shapes of other conductor end portions that project out from the coil ends, rectifier apparatuses, connecting terminals, etc. However, because the conventional devices that are described above simultaneously bend and form the open end portions of large numbers of coil segments by holding them in holding grooves, they cannot be applied to stators in which the lead around shape differs for each of the conductor end portions.

SUMMARY OF THE INVENTION

The present invention aims to solve the above problems and an object of the present invention is to provide a dynamoelectric stator winding end portion forming apparatus and forming method that enable productivity to be improved by enabling a conductor end portion that is to be bent and formed to be selected from a plurality of conductor end portions that project out from a coil end adjacently and to be bent and formed into a desired shape simply and reliably.

In order to achieve the above object, according to one aspect of the present invention, there is provided a dynamoelectric winding end portion forming apparatus in which a plurality of conductor end portions that project axially outside a stator core adjacently from a coil end of a stator winding that is wound onto the stator core are selected and formed by bending. The dynamoelectric winding end portion forming apparatus includes a holding jig that independently holds a selected conductor end portion so as to permit movement of the selected conductor end portion in an axial direction and restrain movement thereof in a direction that is perpendicular to the axial direction. The apparatus includes a holding jig elevating portion that moves the holding jig so as to make the holding jig hold a region of the selected conductor end portion that is a predetermined distance away from the coil end in an axial direction of the stator core. Further, the apparatus includes a main drive portion that moves the holding jig that is holding the region of the selected conductor end portion to a vicinity of the coil end along an arc that is centered around a part of the selected conductor end portion near the coil end and that has a radius equal to the predetermined distance.

According to another aspect of the present invention, there is provided a dynamoelectric winding end portion forming method in which a plurality of conductor end portions that project axially outside a stator core adjacently from a coil end of a stator winding that is wound onto the stator core are selected and formed by bending. The dynamoelectric winding end portion forming method includes a conductor holding step in which a selected conductor end portion is held in a holding jig by inserting the selected conductor end portion into a conductor insertion aperture of the holding jig in a loosely fitted state from a tip end thereof to a region that is a predetermined distance away from the coil end in an axial direction of the stator core; and a conductor bending step in which the holding jig that is holding the selected conductor end portion is moved to a vicinity of the coil end along an arc that is centered around a part of the selected conductor end portion near the coil end and that has a radius equal to the predetermined distance.

According to the present invention, because the holding jig holds the conductor end portion so as to permit axial movement of the conductor end portion and restrain movement thereof in a direction that is perpendicular to the axial direction, the conductor end portion that is to be formed by bending can be selected and held simply. Because the holding jig holds a region of the conductor end portion that is a predetermined distance axially away from the coil end, the holding jig will not give rise to damage by interfering with the coil end or the part of the conductor end portion near the coil end, etc. Because the holding jig bends and forms the conductor end portion by moving it to a vicinity of the coil end along an arc that is centered around the part of the conductor end portion near the coil end and that has a radius equal to a predetermined distance, the conductor end portion can be bent and formed into a desired shape simply, improving productivity.

According to the present invention, in the conductor holding step, because the selected conductor end portion is inserted into the conductor insertion aperture of the holding jig in a loosely-fitted state from a tip end hereof to a region that is a predetermined distance away from the coil end in an axial direction of the stator core, the conductor end portion that is to be bent and formed can be selected and held simply and reliably without being damaged. In the conductor bending step, because the holding jig is moved to a vicinity of the coil end along an arc that is centered around the part of the selected conductor end portion near the coil end and that has a radius equal to the predetermined distance, the conductor end portion in question can be bent into a desired shape without damaging the coil end or the conductor end portions.

BRIEF DESCRIPTION OF THE DRAWINGS

FIGS. 9A and 9B are process diagrams that explain the step of bending the conductor end portion using the winding end portion forming apparatus according to Embodiment 1 of the present invention;

DETAILED DESCRIPTION OF THE PREFERRED EMBODIMENTS

Preferred embodiments of the present invention will now be explained with reference to the drawings.

Embodiment 1

Figure 1:
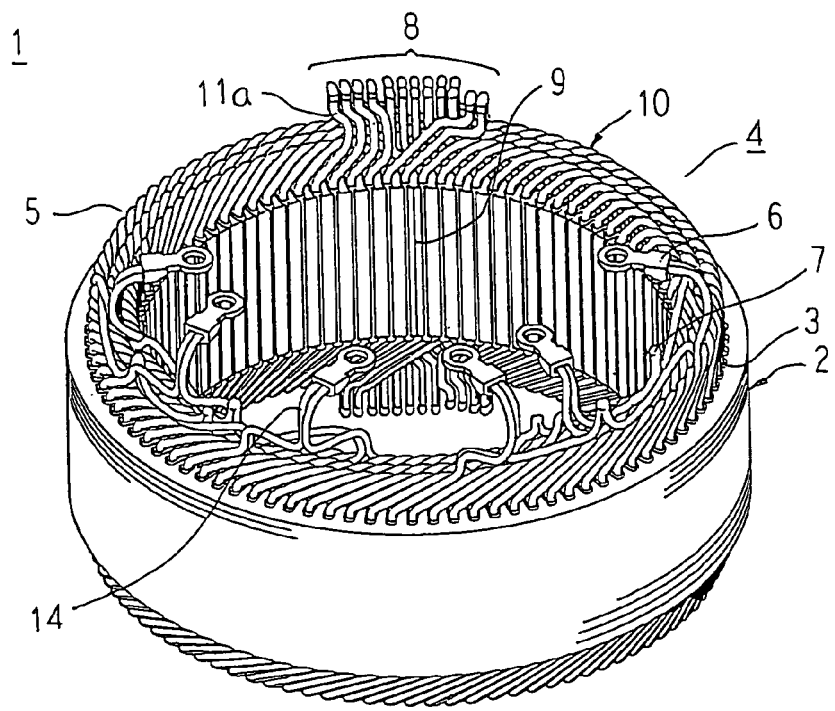
FIG. 1 is a perspective of a dynamoelectric stator that includes a winding that was formed by a winding end portion forming apparatus according to Embodiment 1 of the present invention.
Figure 2:
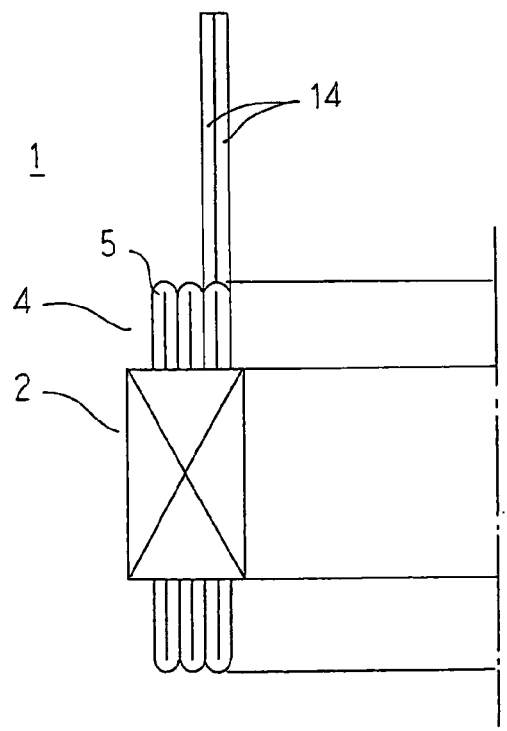
FIG. 2 is a partial cross section that explains a state before end portion forming in the stator that is shown in FIG. 1.
Figure 3:
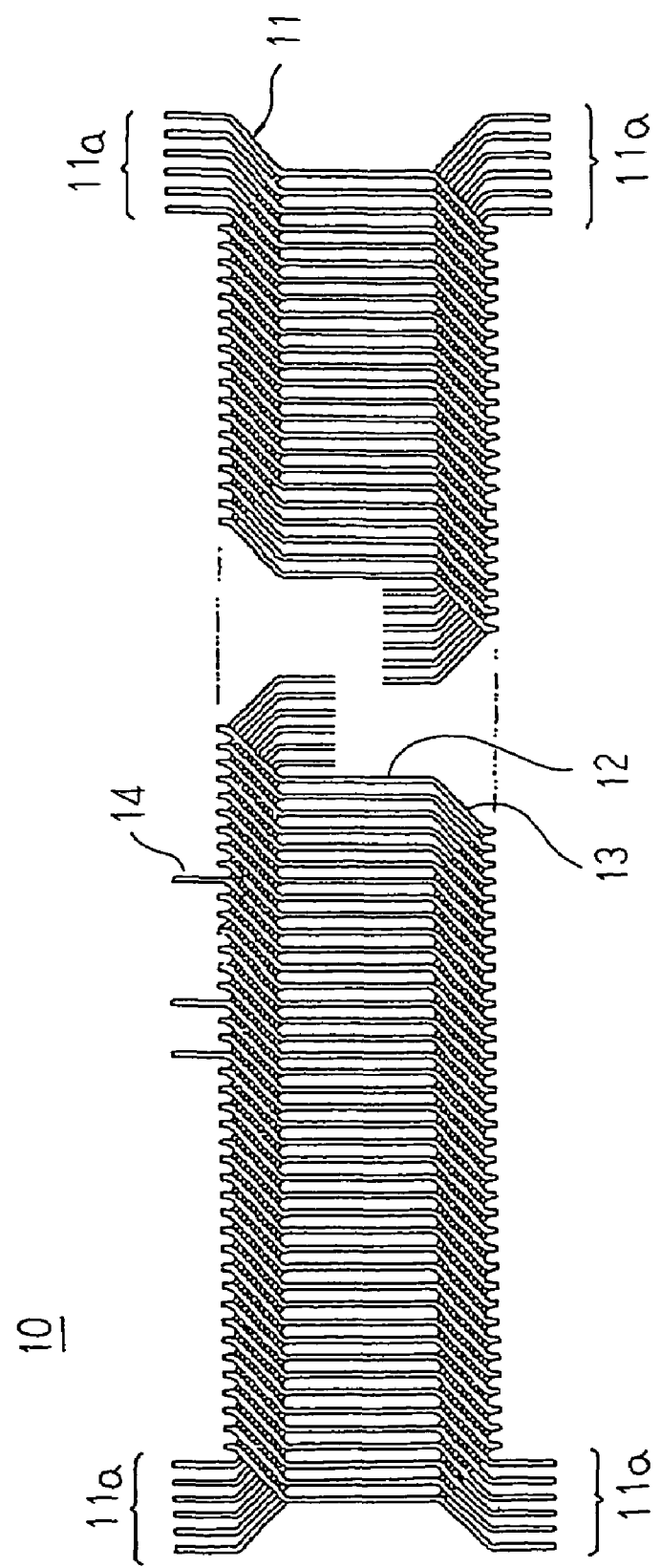
FIG. 3 is a side elevation that explains a winding assembly that is installed in the stator that is shown in FIG. 1.

FIG. 1 is a perspective of a dynamoelectric stator that includes a winding that was formed by a winding end portion forming apparatus according to Embodiment 1 of the present invention, FIG. 2 is a partial cross section that explains a state before end portion forming in the stator that is shown in FIG. 1, and FIG. 3 is a side elevation that explains a winding assembly that is installed in the stator that is shown in FIG. 1.

In FIG. 1, a stator 1 includes: an annular stator core 2 in which a large number of slots 3 that are open on an inner circumferential side are arrayed at a predetermined pitch circumferentially; and a stator winding 4 that is wound onto the stator core 2. The stator winding 4 is prepared by mounting winding assemblies 10 that are described below into the stator core 2 so as to be stacked in three layers in a slot depth direction, and connecting together end portions 11a of continuous conductor wires 11 that constitute the winding assemblies 10. In this example, two delta-connected three-phase windings are prepared by forming output wires 6 and intraphase connection portions 7 of the respective three-phase windings by joining together the conductor end portions 14 that have been formed by bending as described below. Moreover, a single delta-connected three-phase winding can be prepared by changing the combination of joints among the conductor end portion 14. In addition, one or two wye-connected three-phase windings can also be prepared by changing the combination of joints among the conductor end portion 14.

In FIG. 3, a winding assembly 10 is prepared by supplying twelve continuous conductor wires 11 that have a circular cross section, for example, simultaneously and continuously to a winding forming apparatus (not shown). The twelve continuous conductor wires 11 are arrayed at a pitch of one slot and simultaneously bent and formed by the winding forming apparatus. This winding assembly 10 is configured such that pairs of straight slot-housed portions 12 that are adjacent in a direction that is perpendicular to the surface of the page in FIG. 3 are equal in number to the number of slots and are arrayed at a pitch of one slot, and end portions of slot-housed portions 12 that are six slots apart are linked to each other by return portions 13. Six end portions 11a of the twelve continuous conductor wires 11 project outward on each of two sides at two ends of the winding assemblies 10. During bending and forming, conductor end portions 14 that will be formed by bending in a subsequent step are extended outward from the return portions 13 of the winding assembly 10 by increasing the supply of the continuous conductor wires 11 in question at predetermined points in time. The direction of extension of these conductor end portions 14 from the return portions 13 is aligned in a longitudinal direction of the slot-housed portions 12. Here, two conductor end portions 14 are arrayed so as to be adjacent in a direction that is perpendicular to the surface of the page in FIG. 3 at respective predetermined positions in a longitudinal direction of the winding assembly 10.

Winding assemblies 10 that have been configured in this manner are mounted, for example, by housing the pairs of slot-housed portions 12 inside respective slots of a rectangular parallelepiped laminated core (not shown) so as to be stacked in three layers in a slot depth direction. Then, an annular stator core 2 is obtained by bending the laminated core into which the winding assemblies 10 have been mounted into an annular shape, abutting two end surfaces thereof, and welding the abutted surfaces. Thus, the return portions 13 are arrayed neatly at two ends of the stator core 2 at a pitch of one slot circumferentially so as to form three rows radially and constitute coil ends 5 of the stator winding 4.

Here, the end portions 11a of the continuous conductor wires 11 that extend from the two sides at the two ends of the winding assemblies 10 extend outward at the two ends of the abutted portions 9 of the laminated core so as to be adjacent to each other. As shown in FIG. 2, the conductor end portions 14 project axially from the coil ends 5 so as to be radially adjacent.

The end portions 11a of the continuous conductor wires 11 are then connected to each other to form ancillary connection portions 8 at two axial ends of the abutted portions 9. The conductor end portions 14 are bent and formed into shapes that conform to shapes of the circuit configuration and rectifier apparatus, etc., of the dynamoelectric machine. Here, FIGS. 2 and 3 show a state in which the conductor end portions 14 are in initial projecting positions, and FIG. 1 show a state in which they are in predetermined projecting positions.

Moreover, in FIG. 3, a case in which two conductor end portions 14 project adjacently in one direction from the winding assemblies 10 at each position is shown, but the winding assemblies 10 may adopt different shapes depending on the circuit configuration that is required by the dynamoelectric machine. The configuration of the windings and winding end portions in FIGS. 1 through 3 only represent one example. Here, to facilitate explanation, a case in which two conductor end portions 14 project axially outward from the coil ends 5 so as to be radially adjacent will be described.

Next, a brief outline of the winding end portion forming apparatus will be explained with reference to FIGS. 4, 5A, and 5B. Moreover, FIG. 4 is a schematic diagram that explains an overall configuration of the winding end portion forming apparatus according to Embodiment 1 of the present invention, and FIGS. 5A and 5B are diagrams that explain a configuration of a clamping jig in the winding end portion forming apparatus according to Embodiment 1 of the present invention, FIG. 5A being a side elevation thereof and FIG. 5B being a top plan thereof.

Figure 4:
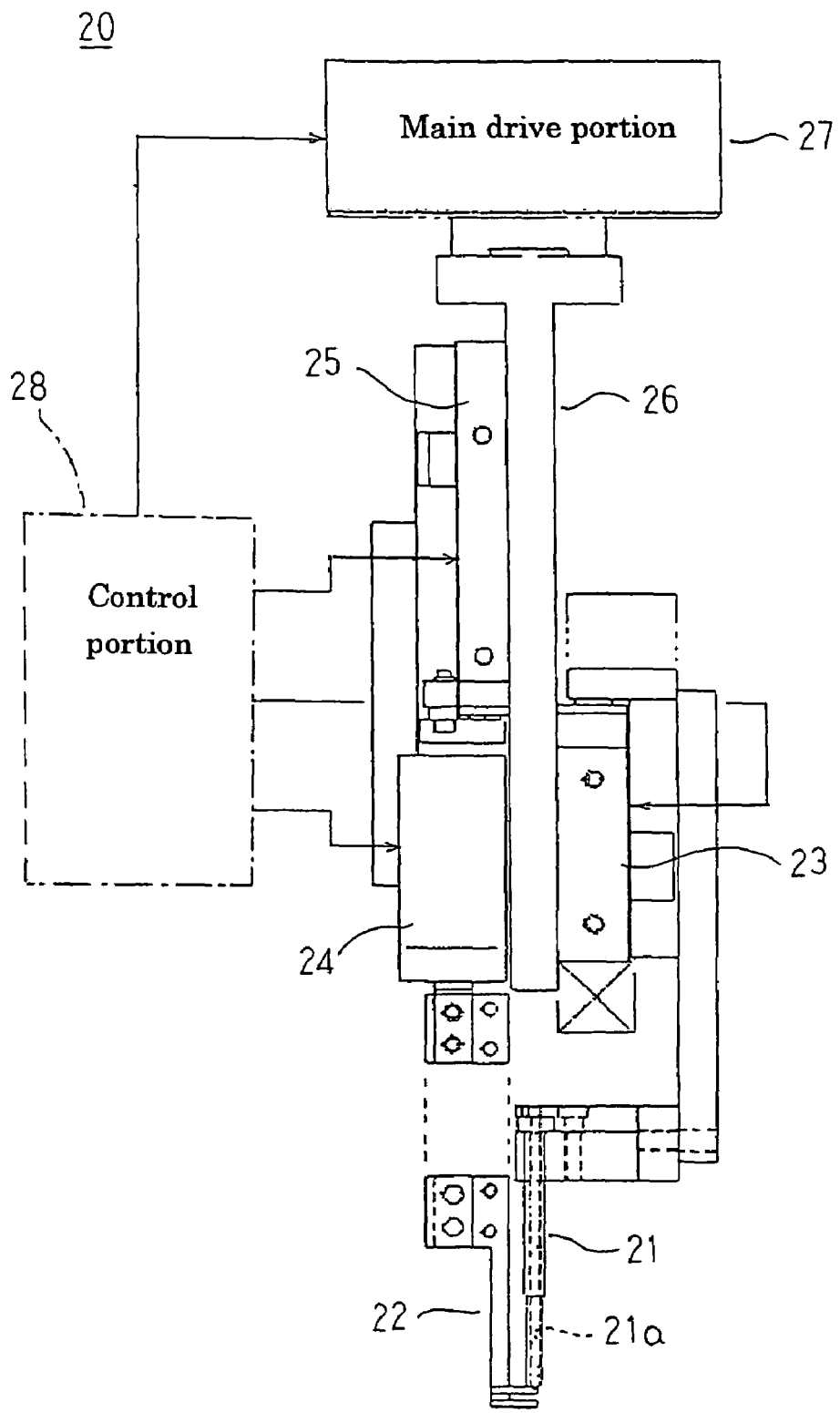
FIG. 4 is a schematic diagram that explains an overall configuration of the winding end portion forming apparatus according to Embodiment 1 of the present invention.
Figures 5A, 5B:
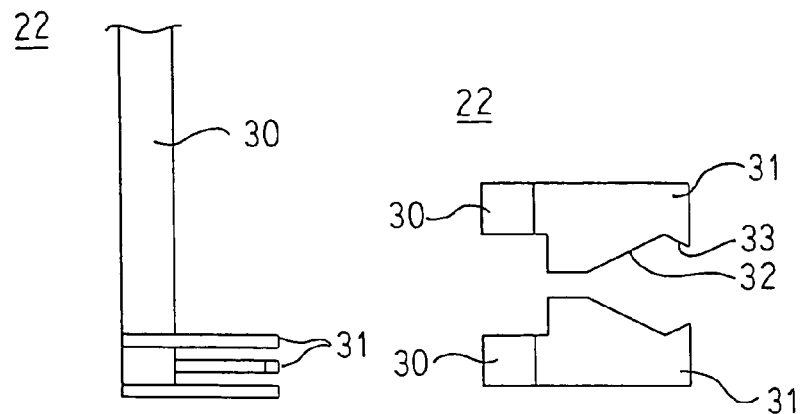
FIGS. 5A and 5B are diagrams that explain a configuration of a clamping jig in the winding end portion forming apparatus according to Embodiment 1 of the present invention.

In FIG. 4, a winding end portion forming apparatus 20 includes: a holding jig 21 that independently holds a conductor end portion 14 that is to be formed by bending; a clamping jig 22 that selects and independently secures the conductor end portion 14 that is to be formed by bending; a holding jig elevating portion 23 that moves the holding jig 21 up and down in FIG. 4; a clamping jig drive portion 24 that moves the clamping jig 22 perpendicular to the surface of the page in FIG. 4; a clamping jig elevating portion 25 that moves the clamping jig drive portion 24 up and down in FIG. 4; a supporting arm 26 to which the holding jig elevating portion 23 and the clamping jig elevating portion 25 are mounted; a main drive portion 27 that moves the supporting arm 26 in three axial directions that are perpendicular to each other, i.e., up and down (Z-axis direction), left and right (X-axis direction), and perpendicular to the surface of the page (Y-axis direction) in FIG. 4; and a control portion 28 that controls driving of the holding jig elevating portion 23, the clamping jig drive portion 24, the clamping jig elevating portion 25, and the main drive portion 27.

The holding jig 21 is made into a cylindrical body in which a conductor insertion aperture 21a that has an inside diameter that is slightly larger than an outside diameter of a conductor end portion 14 is formed on a central axis, and a leading end outer circumferential edge portion and inner circumferential edge portion thereof are each rounded. This holding jig 21 is mounted to the holding jig elevating portion 23 such that an aperture direction of the conductor insertion aperture 21a is aligned in a direction of movement (the Z-axis direction).

As shown in FIG. 5, the clamping jig 22 includes: a pair of stanchions 30; and a pair of gripping portions 31 that grip a conductor end portion 14. Each of the gripping portions 31 has a gripping surface shape on a side surface that is constituted by: a first inclined surface 32 that gradually deepens from a root end portion toward a tip end portion; and a second inclined surface 33 that gradually shallows from a terminus of the first inclined surface 32 toward the tip end portion, and the root end portions thereof are mounted to lower end portions of the stanchions 30. Upper end portions of the pair of stanchions 30 are mounted to the clamping jig drive portion 24 such that the gripping surfaces of the gripping portions 31 are oriented toward each other in the Y-axis direction and the stanchions 30 are parallel to each other, and the pair of stanchions 30 are reciprocated by the clamping jig drive portion 24 in a direction that brings them together or moves them apart. Here, the gripping portions 31 are mounted so as to be offset in a longitudinal direction of the stanchions 30 so as not to interfere with each other while reciprocating.

The clamping jig drive portion 24 is mounted to the clamping jig elevating portion 25 such that the tip end portions of the gripping portions 31 face the holding jig 21. Here, a direction of movement of the clamping jig drive portion 24 (the clamping jig 22) by the clamping jig elevating portion 25 is the Z-axis direction in a similar manner to the direction of movement of the holding jig 21 by the holding jig elevating portion 23.

Figure 6A:
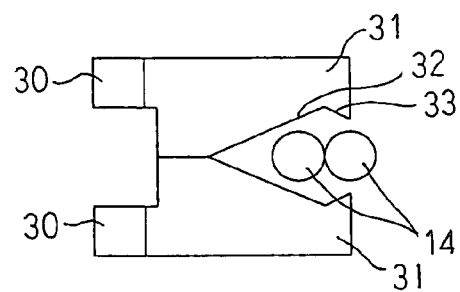
FIGS. 6A, 6B, and 6C are process diagrams that explain a gripping operation of the clamping jig in the winding end portion forming apparatus according to Embodiment 1 of the present invention.
Figure 6B:
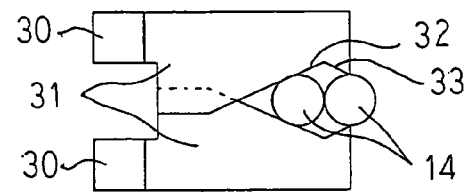
Figure 6C:
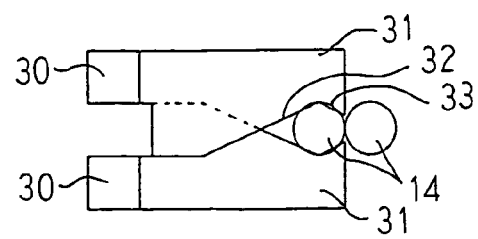

Next, an operation for gripping a conductor end portion 14 using the clamping jig 22 will be explained with reference to FIG. 6. FIGS. 6A, 6B, and 6C are process diagrams that explain a gripping operation of the clamping jig in the winding end portion forming apparatus according to Embodiment 1 of the present invention, FIG. 6A showing a set state, FIG. 6B showing a gripping operation process, and FIG. 6C showing a gripping state.

First, the clamping jig elevating portion 25 moves the clamping jig 22 to a predetermined position together with the clamping jig drive portion 24. Next, the clamping jig drive portion 24 moves the pair of stanchions 30 until they are separated by a predetermined distance. Then, the main drive portion 27 moves the supporting arm 26 to set the clamping jig 22 such that at least one of two adjacent (first and second) conductor end portions 14 enters the pair of gripping portions 31, as shown in FIG. 6A.

Next, the clamping jig drive portion 24 moves in a direction that brings the pair of stanchions 30 into close proximity. Here, as the pair of gripping portions 31 move into close proximity, the facing first inclined surfaces 32 are placed in contact with an outer circumferential surface of the first conductor end portion 14 and act to move the conductor end portions 14 toward the tip end portion, as shown in FIG. 6B. The outer (second) conductor end portion 14 is thereby pushed outside the pair of gripping portions 31.

Next, when the pair of gripping portions 31 reach a predetermined distance, movement of the pair of stanchions 30 by the clamping jig drive portion 24 is stopped. Thus, an outer circumferential surface of the first conductor end portion 14 is held from four directions by the first and second inclined surfaces 32 and 33 of the pair of gripping portions 31, as shown in FIG. 6C. Here, the second conductor end portion 14 is pushed outside the pair of gripping portions 31, and the clamping jig 22 selects and independently secures one (the first) conductor end portion 14. Moreover, it is not absolutely necessary for the gripping portions 31 to grip the conductor end portion 14 in a fixed state, and the conductor end portion 14 may also be gripped in a loosely-fitted state such that axial movement of the conductor end portion 14 is permitted and movement in a direction that is perpendicular to the axial direction is restrained.

Figure 7A:
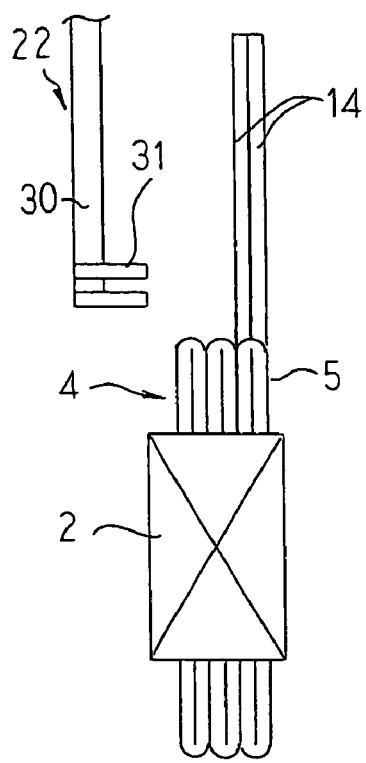
FIGS. 7A, 7B, and 7C are process diagrams that explain a step of selecting a conductor end portion using the winding end portion forming apparatus according to Embodiment 1 of the present invention.
Figure 7B:
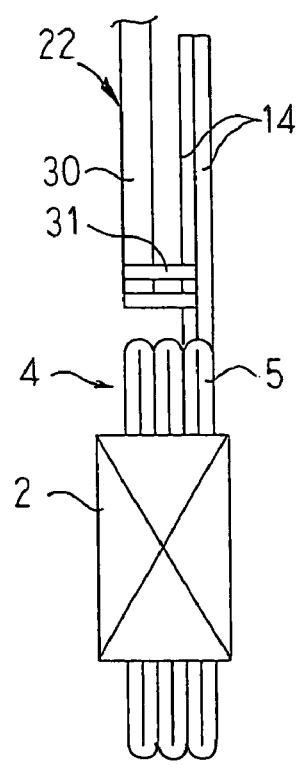
Figure 7C:
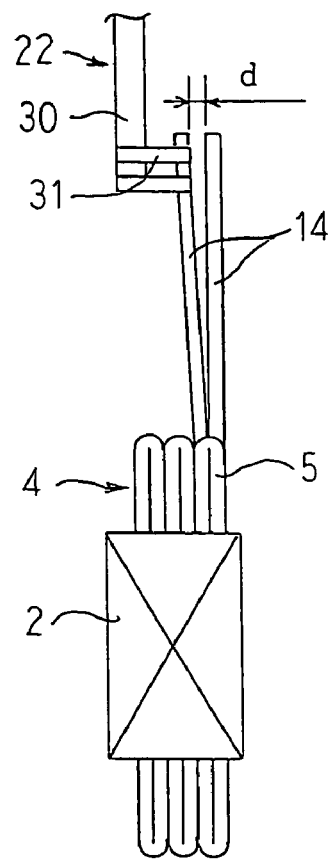
Figure 8A:
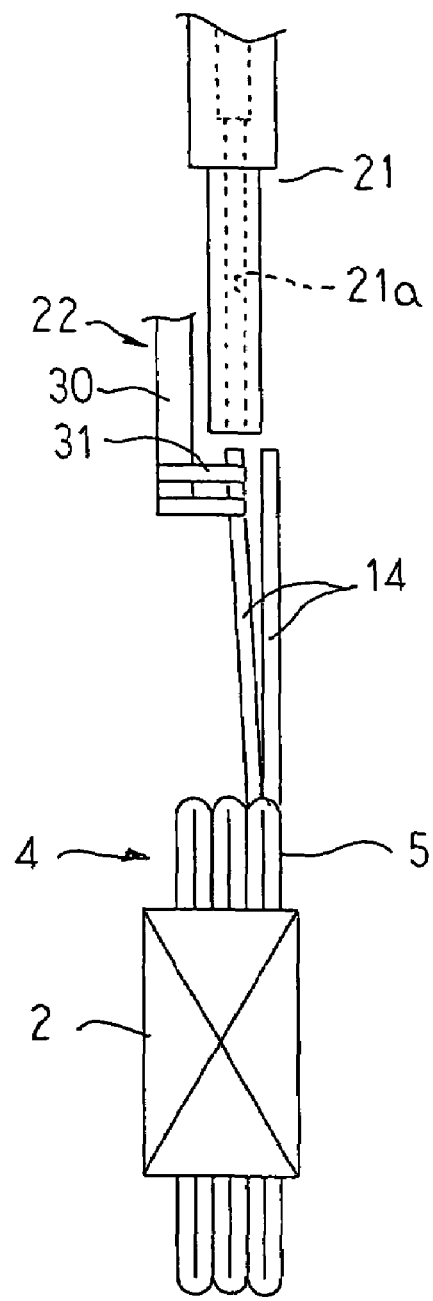
FIGS. 8A and 8B are process diagrams that explain a step of bending the conductor end portion using the winding end portion forming apparatus according to Embodiment 1 of the present invention.
Figure 8B:
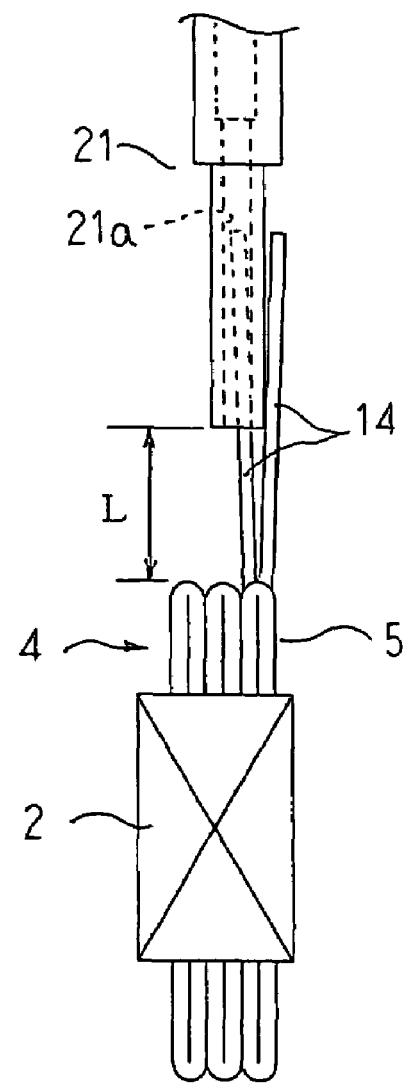

Next, a winding end portion forming method will be explained with reference to FIGS. 7 through 9. Moreover, FIGS. 7A, 7B, and 7C are process diagrams that explain a step of selecting a conductor end portion using the winding end portion forming apparatus according to Embodiment 1 of the present invention, FIG. 7A showing a set state of a clamping jig, FIG. 7B showing a state in which a root portion of the conductor end portion is gripped by the clamping jig, and FIG. 7C showing a state in which the conductor end portion is selected by the clamping jig. FIGS. 8A and 8B are process diagrams that explain a step of bending the conductor end portion using the winding end portion forming apparatus according to Embodiment 1 of the present invention, FIG. 8A showing a set state of a holding jig, and FIG. 8B showing a state in which the conductor end portion is gripped by the holding jig. FIGS. 9A and 9B are process diagrams that explain the step of bending the conductor end portion using the winding end portion forming apparatus according to Embodiment 1 of the present invention, FIG. 9A showing the process of bending of the conductor end portion, and FIG. 9B showing a state in which the bending of the conductor end portion has been completed.

Winding end portion forming in this case means leading two conductor end portions 14 that protrude axially outward from the coil ends 5 in close proximity to each other around circumferentially and radially above the coil ends 5 from initial projecting positions to predetermined projecting positions. The conductor end portions 14 project outward from the coil ends 5 at the initial projecting positions for a length in which a lead around length is added to a length required to enable connection to other parts at the predetermined projecting positions. The stator 1 is set in the winding end portion forming apparatus so as to have an axial direction aligned in the Z-axis direction. Here, a simple bending step will be described in order to facilitate understanding. The holding jig elevating portion 23, the clamping jig drive portion 24, the clamping jig elevating portion 25, and the main drive portion 27 are actuators that are operated using commonly-known servomotors or high-pressure oil, etc., as driving sources, and operation thereof is controlled by the control portion 28.

(Selecting Step)

This selecting step is a step of selecting a first of two adjacent conductor end portions 14 without interfering with the second conductor end portion 14. Here, "selecting" means securing a separated state of the two conductor end portions 14.

First, the holding jig elevating portion 23 is driven such that the holding jig 21 is moved to an uppermost position. The clamping jig elevating portion 25 is driven such that the gripping portions 31 of the clamping jig 22 are moved to a position that is level with a vicinity of a root portion of the selected conductor end portion 14 that projects from the coil ends 5. In addition, the clamping jig drive portion 24 is driven such that the pair of stanchions 30 are moved until separated by a predetermined distance.

Next, the main drive portion 27 is driven such that the gripping portions 31 of the clamping jig 22 are moved to a position that is in close proximity to the selected conductor end portion 14, as shown in FIG. 7A. Then, the main drive portion 27 is driven such that the clamping jig 22 is moved such that a vicinity of the projecting root portion of the selected conductor end portion 14 is inserted into the pair of gripping portions 31. Next, the clamping jig drive portion 24 is driven such that the selecting operation that is described above is performed. The projecting root portion of the selected conductor end portion 14 is thereby secured independently in the clamping jig 22, as shown in FIG. 7B.

Next, the clamping jig drive portion 24 is driven such that the pair of gripping portions 31 are opened slightly. Moreover, this step can be omitted if the gripping portions 31 already grip in a loosely-fitted state that permits axial movement of the conductor end portion 14. The main drive portion 27 is subsequently driven such that the clamping jig 22 is moved axially away from the coil ends 5 while moving a minute distance radially away from the nonselected conductor end portion 14. The clamping jig 22 thereby moves to the tip end portion of the selected conductor end portion 14 without interfering with the nonselected conductor end portion 14, and the conductor end portion 14 is in an independently selected state. Thus, the tip end of the selected conductor end portion 14 is a predetermined clearance d away from the tip end of the nonselected conductor end portion 14 without excessive deformation of the conductor end portions 14, as shown in FIG. 7C.

(Bending Step)

The holding jig 21 is configured so as to be positioned axially outside the conductor end portion 14 that has been selected by the clamping jig 22 when the selected conductor end portion 14 has been independently selected by the clamping jig 22, as shown in FIG. 8A. Then, the holding jig elevating portion 23 is driven such that the holding jig 21 is lowered by a predetermined amount and the tip end of the conductor end portion 14 is inserted into the conductor insertion aperture 21a of the holding jig 21. Next, the clamping jig drive portion 24 is driven such that the pair of stanchions 30 are moved to a maximum distance apart. In addition, the clamping jig elevating portion 25 is driven such that the clamping jig 22 is moved to an uppermost position without interfering with the holding jig 21.

Next, the holding jig elevating portion 23 is driven such that the conductor end portion 14 is inserted into the conductor insertion aperture 21a while the tip end of the holding jig 21 is lowered to a position that is a distance L axially away from the coil ends 5, as shown in FIG. 8B. This distance L corresponds to the lead around length of the conductor end portion 14. Here, because the tip end of the selected conductor end portion 14 is the predetermined clearance d away from the tip end of the nonselected conductor end portion 14, the holding jig 21 can be lowered without interfering with the nonselected conductor end portion 14.

Next, the main drive portion 27 is driven such that the holding jig 21 is moved by a distance L axially toward the coil ends 5 while also being moved in a lead around direction (circumferentially) by a distance L. The tip end of the holding jig 21 is thereby moved in an arc that has a radius L that is centered around a vicinity of the projecting root portion of the conductor end portion 14, and the conductor end portion 14 is bent approximately at a right angle circumferentially in the vicinity of the projecting root portion and is bent approximately at a right angle axially at a region that is a distance L away, as shown in FIG. 9A.

Next, the main drive portion 27 is driven such that the holding jig 21 is moved to an uppermost position, as shown in FIG. 9B, completing the step of bending the selected conductor end portion 14.

A case in which a second lead around is required on the selected conductor end portion 14 will now be described. First, a first lead around is completed by moving the holding jig 21 by a distance L axially toward the coil ends 5 while moving it in the lead around direction (circumferentially) by a distance L, and then the holding jig 21 is raised axially outward by a second lead around amount L1. Then the holding jig 21 moves a distance L1 axially toward the coil ends 5, while moving in the lead around direction (circumferential) by a distance L1. The conductor end portion 14 is thereby formed so as to have a lead around shape that is bent approximately at a right angle circumferentially in the vicinity of the projecting root portion, is bent in a predetermined direction along the coil ends 5 at a region that is a distance L away, and is also bent approximately at a right angle axially at a region that is a distance L1 away. Moreover, leading around can be performed a large number of times by repeating this bending step.

Next, a case in which the remaining conductor end portion 14 is formed will be described. Because the remaining conductor end portion 14 is not adjacent to another conductor end portion 14, the clamping jig 22 is simply moved axially away from the coil ends 5 with the pair of gripping portions 31 open slightly in the step shown in FIG. 7C that is described above. Moreover, the other steps are similar.

Moreover, if three or more conductor end portions 14 are adjacent, a second selected conductor end portion 14 will be adjacent to a remaining conductor end portion 14. Thus, the selecting step and the bending step that are described above will be repeated.

The conductor end portions 14 that project out from the coil ends 5 are formed by bending in this manner and are then joined to other parts.

According to Embodiment 1, because a conductor end portion 14 is inserted into the conductor insertion aperture 21a of the holding jig 21 in a loosely-fitted state and the conductor end portion 14 is held independently, the conductor end portion 14 can be inserted into the conductor insertion aperture 21a smoothly, reducing time loss and also suppressing the occurrence of damage to the conductor end portion 14.

Because the projecting root end portion of the conductor end portion 14 is not inserted into the holding jig 21, the coil ends 5 and the projecting root end portions of the two adjacent conductor end portions 14 do not come into contact with the holding jig 21. Thus, damage to the coil ends 5 and the root end portions of the conductor end portions 14 that might otherwise result from operation of the holding jig 21 is eliminated, thereby improving reliability.

Because the selected conductor end portion 14 is inserted into the conductor insertion aperture 21a from the tip end thereof, interference between the selected conductor end portion 14 and the nonselected conductor end portion 14 can be avoided during bending and forming, suppressing the occurrence of damage to the conductor end portions 14. In addition, a conductor end portion 14 that has only a small amount of projection can also be held easily.

Because the holding jig 21 holds the conductor end portion 14 so as to surround an outer circumference of a region that is a predetermined distance L axially away from the coil ends 5, the conductor end portion 14 will not dislodge from the holding jig 21, etc., during bending and forming.

Because the holding jig 21 is made into a cylindrical body, even if the holding jig 21 interferes with the nonselected conductor end portion 14 during operation, the occurrence of damage to the nonselected conductor end portion 14 is suppressed.

Because the conductor insertion aperture 21a has a circular cross section, even if a change in the direction of bending is required after the conductor end portion 14 is already held by the holding jig 21, it is not necessary for the holding jig 21 itself to be rotated around the axis of the conductor end portion 14; the direction of movement of the holding jig 21 by the main drive portion 27 need only be changed.

Because two positions are bent by moving the holding jig 21 along an arc that has a radius L that is centered around the projecting root portions of the conductor end portions 14 to a vicinity of the coil ends 5, two bends are formed in a single stroke of the holding jig 21, shortening bend forming time. The conductor end portions 14 do not move in the aperture direction of the conductor insertion aperture 21a inside the conductor insertion aperture 21a during this movement of the holding jig 21. Thus, the conductor end portions 14 will not be damaged by rubbing against the inner wall surface of the conductor insertion aperture 21a. Because the coil ends 5 are configured such that return portions 13 are arrayed neatly at a pitch of one slot circumferentially, the conductor end portions 14 project outward from tightly-packed coil ends 5, enabling the conductor end portions 14 to be bent and formed by the movement operation of the holding jig 21 that is described above alone, without having to fasten projecting root end portions of the conductor end portions 14 using a separate jig. In addition, because the holding jig 21 has both conductor holding and conductor bending functions, the apparatus can be made compact. Because it is not necessary to hold the nonselected conductor end portion 14, the apparatus can be made proportionately more compact.

Because the clamping jig 22 secures the conductor end portion 14 independently by gripping (securing) a projecting root end portion of the conductor end portion 14 in a loosely-fitted state and then moving axially outward to a tip end portion of the conductor end portion 14, positioning between the tip end of the conductor end portion 14 and the conductor insertion aperture 21a of the holding jig 21 can be performed reliably. In other words, situations in which the tip end portion of the conductor end portion 14 sways and the conductor end portion 14 cannot be inserted into the conductor insertion aperture 21a of the holding jig 21 are prevented.

Because the clamping jig 22 is moved away from the nonselected conductor end portion 14 while moving axially outward, the tip end of the selected conductor end portion 14 can be separated from the tip end of the nonselected conductor end portion 14 without applying excessive deformation to the selected conductor end portion 14. Thus, the holding jig 21 can be prevented from interfering with and damaging the nonselected conductor end portion 14 during the holding operation in which the conductor end portion 14 is inserted into the conductor insertion aperture 21a.

Moreover, in Embodiment 1 above, the holding jig 21 itself is moved in such a way that the tip end of the holding jig 21 moves along an arc that has a radius L, but the stator 1 may also be moved in such a way that the tip end of the holding jig 21 moves along an arc that has a radius L.

In Embodiment 1 above, the holding jig 21 and the clamping jig 22 are constituted by separate parts, but the two jigs may also be configured integrally.

In Embodiment 1 above, two adjacent conductor end portions 14 are bent and formed individually, but if the lead around shapes of these conductor end portion 14 are similar, two holding jigs 21 may also be mounted and the two conductor end portions 14 held in each of the holding jigs 21 and bent and formed simultaneously. In addition, a large number of conductor end portions 14 may also be bent and formed simultaneously by increasing the number of holding jigs 21.

Embodiment 2

Figures 10A, 10B, 10C:
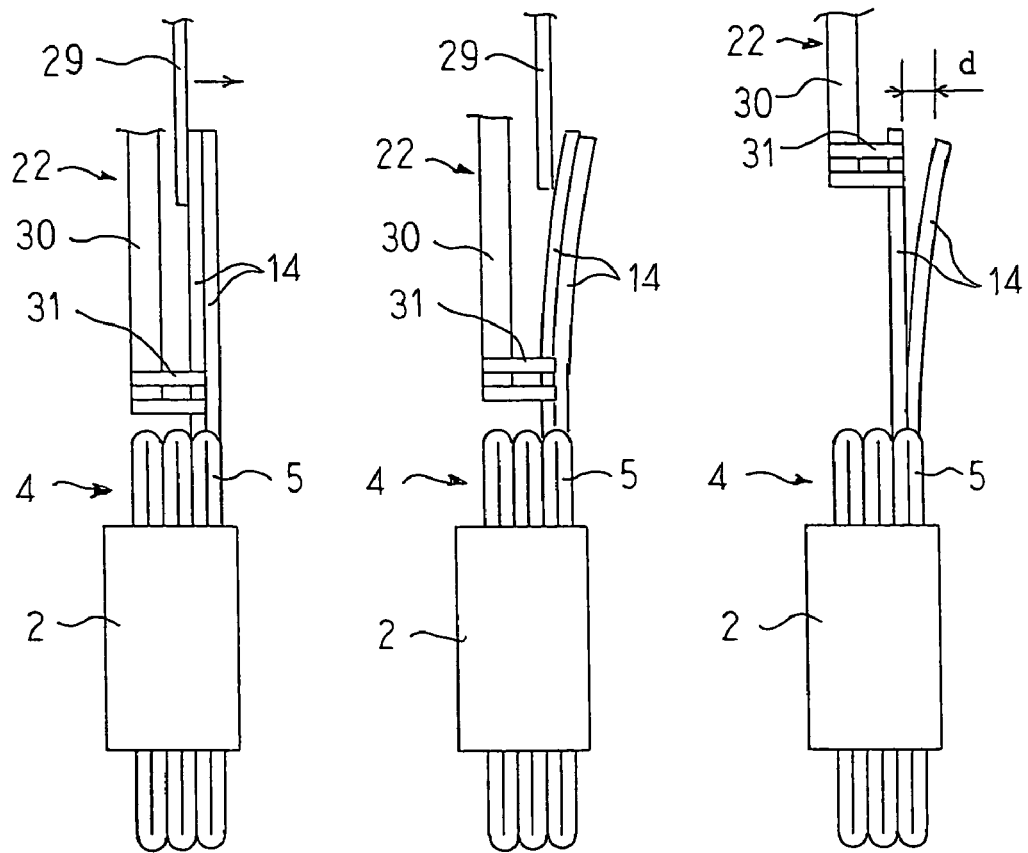
FIGS. 10A, 10B, and 10C are process diagrams that explain a step of selecting a conductor end portion using a winding end portion forming apparatus according to Embodiment 2 of the present invention.

FIGS. 10A, 10B, and 10C are process diagrams that explain a step of selecting a conductor end portion using a winding end portion forming apparatus according to Embodiment 2 of the present invention, FIG. 10A showing a state in which a root portion of the conductor end portion is gripped by a clamping jig, FIG. 10B showing a state in which the conductor end portion is bent by a bending jig, and FIG. 10C showing a state in which the conductor end portion is selected by the clamping jig.

A winding end portion forming apparatus according to Embodiment 2 includes a bending jig 29. Although not shown, the winding end portion forming apparatus also includes: a bending jig elevating portion that moves the bending jig 29 up and down in FIG. 10A; and a bending jig drive portion that moves the bending jig 29 left and right in FIG. 10A. The bending jig elevating portion and the bending jig drive portion are activated and controlled by a control portion 28.

Next, a selecting step according to Embodiment 2 will be explained.

First, a main drive portion 27 is driven such that a clamping jig 22 is moved to a position that is in close proximity to the selected conductor end portion 14. In addition, the main drive portion 27 is driven such that the clamping jig 22 is moved such that a vicinity of the projecting root portion of the selected conductor end portion 14 is inserted into the pair of gripping portions 31. Next, the clamping jig drive portion 24 is driven such that a selecting operation is performed. The projecting root portion of the selected conductor end portion 14 is thereby secured independently in the clamping jig 22.

Next, the bending jig elevating portion is driven such that the bending jig 29 is lowered to a position that is in close proximity to the conductor end portion 14, as shown in FIG. 10A. Then, the bending jig drive portion is driven such that the bending jig 29 is moved away from the clamping jig 22. Two adjacent conductor end portions 14 are thereby pressed by the bending jig 29 and are bent together, as shown in FIG. 10B. Then, the bending jig drive portion is driven such that the bending jig 29 is returned to its original position, and the bending jig elevating portion is also driven such that the bending jig 29 is raised. Thus, the two adjacent conductor end portions 14 return to their original states. However, the amount of springback is different in the two conductor end portions 14, and a clearance d is formed at the tip ends, as shown in FIG. 10C. Next, the clamping jig drive portion 24 is driven such that a pair of gripping portions 31 are opened slightly. The main drive portion 27 is subsequently driven such that the clamping jig 22 is moved only axially away from the coil ends 5. The clamping jig 22 thereby moves to the tip end portion of the selected conductor end portion 14 without interfering with the nonselected conductor end portion 14, and the conductor end portion 14 is in an independently selected state.

Moreover, a bending step is performed in a similar manner to that of Embodiment 1 above.

Consequently, similar effects to those in Embodiment 1 above can also be achieved in Embodiment 2.

Furthermore, it is only necessary to move the clamping jig 22 axially outward from the root end portion of the conductor end portion 14 during the operation of selecting the conductor end portion 14 by the clamping jig 22. In other words, it is not necessary to move the clamping jig 22 away from the nonselected conductor end portion 14. Thus, simplification of the movement mechanism of the clamping jig 22 becomes possible.

Moreover, in Embodiment 2, a bending jig 29 is explained as being disposed additionally, but the holding jig 21 may also be given the function of a bending jig.

Embodiment 3

Figure 11:
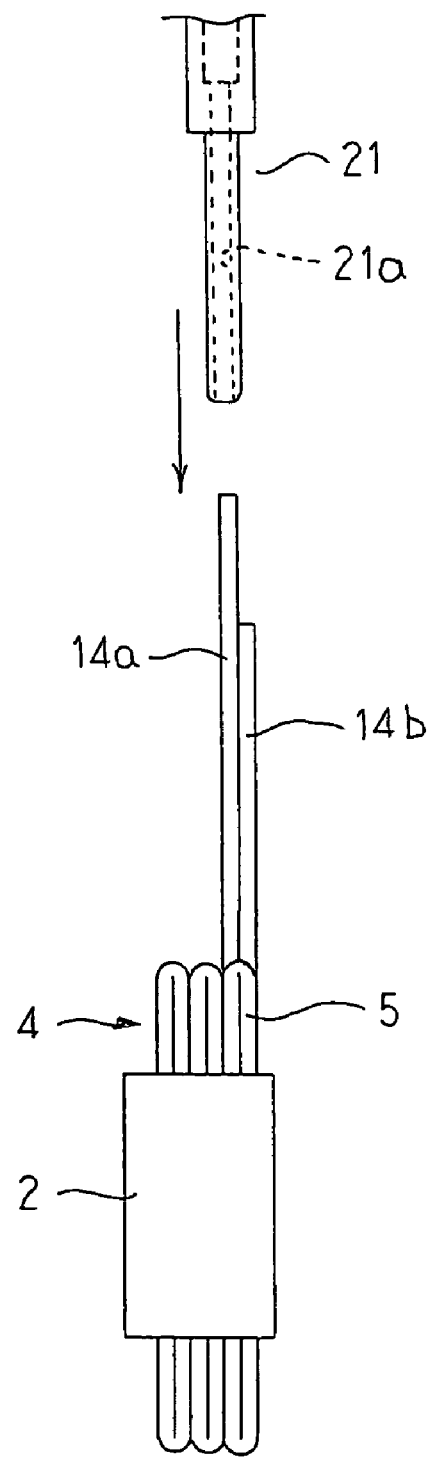
FIG. 11 is a process diagram that explains a step of bending a conductor end portion using a winding end portion forming apparatus according to Embodiment 3 of the present invention.

FIG. 11 is a process diagram that explains a step of bending a conductor end portion using a winding end portion forming apparatus according to Embodiment 3 of the present invention.

In FIG. 11, two conductor end portions 14a and 14b project axially outward from coil ends 5 adjacently. Here, an amount of projection of the selected conductor end portion 14a from the coil ends 5 is made greater than that of the nonselected conductor end portion 14b.

Moreover, the rest of this embodiment is configured in a similar manner to Embodiment 1 above.

According to Embodiment 3, first, the main drive portion 27 is driven such that the conductor insertion aperture 21a of the holding jig 21 is positioned axially outside the selected conductor end portion 14a. Then, the holding jig elevating portion 23 is driven such that the tip end of the holding jig 21 is lowered to a position that is the amount of lead around axially away from the coil ends 5. Next, the main drive portion 27 is driven such that the tip end of the holding jig 21 is moved along an arc that has a radius equal to the amount of lead around and that is centered around the vicinity of the projecting root portion of the selected conductor end portion 14a. The holding jig 21 is subsequently raised axially, completing a predetermined bending and forming of the selected conductor end portion 14a.

Next, bend forming of the remaining conductor end portion 14b is performed in a similar manner.

Thus, according to Embodiment 3, because the length of the selected conductor end portion 14a is made longer, a selecting step is no longer necessary, enabling simplification of the configuration of the winding end portion forming apparatus.

Because rounding is applied to the leading end outer circumferential edge portion of the holding jig 21, as the holding jig 21 is lowered while inserting the selected conductor end portion 14a into the conductor insertion aperture 21a, the rounded shape of the leading end outer circumferential edge portion of the holding jig 21 pushes the nonselected conductor end portion 14b away, enabling the occurrence of damage to the nonselected conductor end portion 14b to be suppressed. Here, if the holding jig 21 is moved away from the nonselected conductor end portion 14b while being lowered, interference between the holding jig 21 and the nonselected conductor end portion 14b can be eliminated, enabling the occurrence of damage to the nonselected conductor end portion 14b to be prevented.

Moreover, each of the above embodiments is explained as it applies to a stator 1 in which a stator winding 4 that is constituted by winding assemblies 10 is installed in a stator core 2, but the present invention can be applied to bending and forming of any conductor end portions that project axially from coil ends of a stator winding adjacently and is not limited to stator windings that are constituted by winding assemblies.

In each of the above embodiments, continuous conductor wires that have a circular cross section are used, but the conductor wires are not limited to those that have a circular cross section, and for example, those that have an elliptical cross section or a polygonal cross section, etc., can be used. In that case, the tubular shape of the holding jig 21 need only be a shape that envelops the outer circumference of the conductor wires, and may also be a shape similar to the cross-sectional shape of the conductor wires, or may also be a circular shape.

What is claimed is:

1. A dynamoelectric winding end portion forming apparatus in which a plurality of conductor end portions that project axially outside a stator core adjacently from a coil end of a stator winding that is wound onto said stator core are selected and formed by bending, said dynamoelectric winding end portion forming apparatus comprising:

a holding jig that independently holds a selected conductor end portion so as to permit movement of said selected conductor end portion in an axial direction and restrain movement thereof in a direction that is perpendicular to said axial direction, wherein said holding jig is an elongated cylindrical body having a longitudinal central axis alone which is formed a conductor insertion aperture that has an inside diameter slightly larger than an outside diameter of said selected conductor end portion and a tip end that faces the coil end of the stator winding;

a holding jig elevating portion that moves said holding jig so as to make said conductor insertion aperture hold a region of said selected conductor end portion that is a predetermined distance away from said coil end in an axial direction of said stator core; and a main drive portion that moves said conductor insertion aperture that is holding said region of said selected conductor end portion to a vicinity of said coil end along an arc that is centered around a projecting root end portion of said selected conductor end portion located near said coil end and that has a radius equal to a distance from the tip end to the projecting root end portion thereby simultaneously forming two bends on said selected conductor end portion wherein a first bend is located at the projecting root end portion of said selected conductor end portion and a second bend is located on a portion of said the conductor end portion located near the tip end of said conductor insertion aperture.

2. A dynamoelectric winding end portion forming apparatus according to claim 1, wherein said holding jig holds said region of said selected conductor end portion so as to cover an outer circumference of said region.

3. A dynamoelectric winding end portion forming apparatus according to claim 1, further comprising:

a clamping jig that selects and secures said selected conductor end portion so as to permit movement of said selected conductor end portion in said axial direction and restrain movement thereof in a direction that is perpendicular to said axial direction; and a clamping jig drive portion that drives said clamping jig so as to secure or release said selected conductor end portion.

* * * * *